United States Patent [19]

Pavese

[11] 4,066,145

[45] Jan. 3, 1978

[54] COMPACT SAW HORSE

[75] Inventor: Bud M. Pavese, Hobart, Ind.

[73] Assignee: The Raymond Lee Organization, Inc., New York, N.Y. ; a part interest

[21] Appl. No.: 746,502

[22] Filed: Dec. 1, 1976

[51] Int. Cl.[2] .......... F16M 11/00

[52] U.S. Cl. .......... 182/153; 182/184; 182/111; 182/129

[58] Field of Search .......... 182/153, 154, 181, 182, 182/183, 184, 185, 186, 224, 225, 226, 227, 111, 129; 108/115

[56] References Cited

U.S. PATENT DOCUMENTS

| | | | |
|---|---|---|---|
| 412,989 | 10/1889 | Sixsmith | 182/182 |
| 1,638,839 | 8/1925 | Farmer | 182/153 |
| 1,957,362 | 5/1934 | Smith | 182/224 |
| 2,911,265 | 11/1959 | Hannah | 182/181 |
| 2,960,151 | 11/1960 | Fairgrieve | 182/186 |

FOREIGN PATENT DOCUMENTS

| | | | |
|---|---|---|---|
| 638,844 | 6/1950 | United Kingdom | 182/183 |

*Primary Examiner*—Reinaldo P. Machado
*Attorney, Agent, or Firm*—Daniel Jay Tick

[57] ABSTRACT

Top, bottom and a pair of side panel type members are affixed to each other at their ends to form a rectangular configuration. A pair of foot members are pivotally affixed to the bottom member in juxtaposition therewith in spaced relation with each other in a manner whereby the foot members are positioned in alignment with the members in inoperable position and extend at right angles with the bottom member, although in a plane parallel to that of the bottom member, in operable position whereby they support the saw horse in an upright position.

2 Claims, 4 Drawing Figures

COMPACT SAW HORSE

BACKGROUND OF THE INVENTION

The present invention relates to a compact saw horse.

Objects of the invention are to provide a compact saw horse of simple structure, which is inexpensive in manufacture, light in weight, carried and stored with facility and convenience, and in a minimum space, and functions efficiently, effectively and reliably as a sturdy and reliable horse for all purposes.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
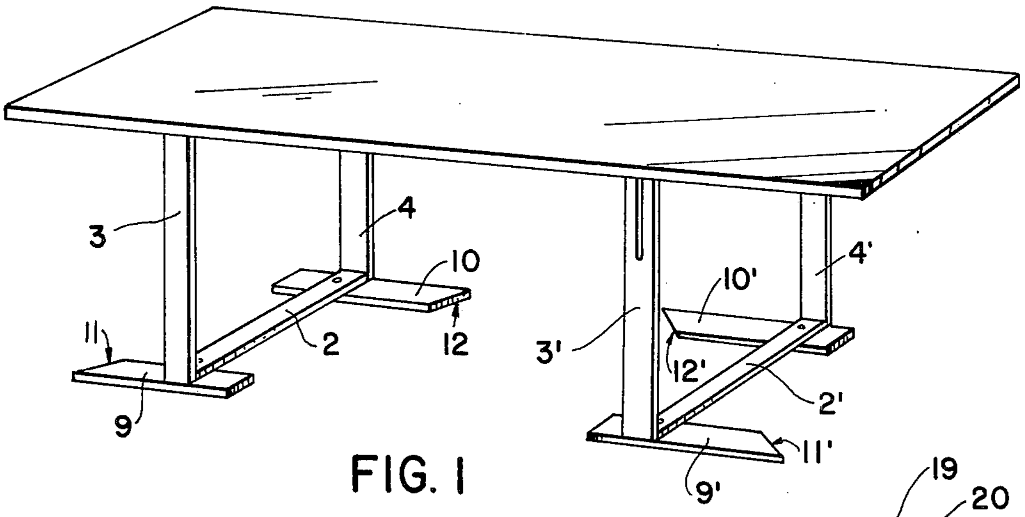
FIG. 1 is a perspective view of the bottom parts of a pair of saw horses of the invention.
Figure 3:
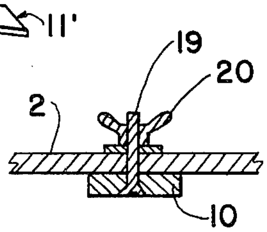
FIG. 3 is a cross-sectional view, on an enlarged scale, illustrating the securing of a foot member to the bottom member of the saw horse of the invention.
Figure 2:
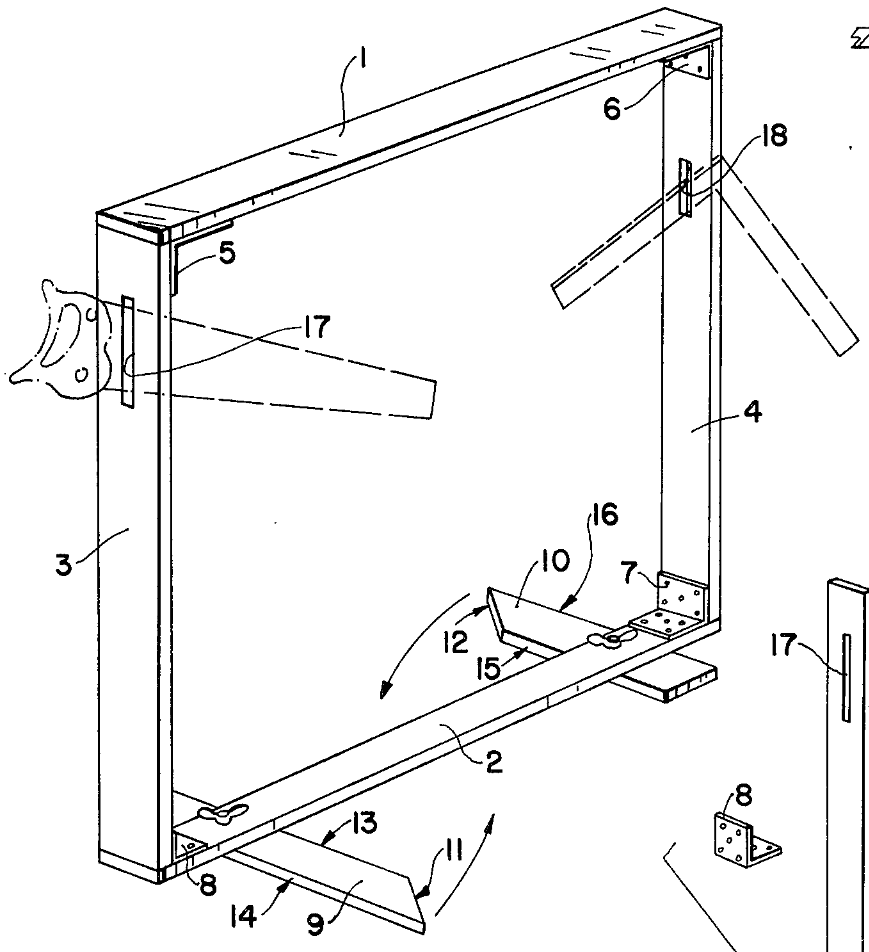
FIG. 2 is a perspective view, on an enlarged scale, of an embodiment of the saw horse of the invention.
Figure 4:
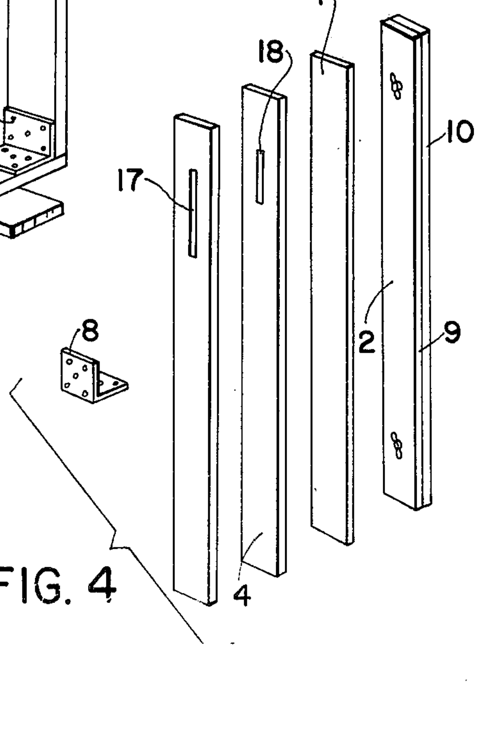
FIG. 4 is an exploded view of the members and a fastener which constitute the saw horse of the invention when assembled.

The compact saw horse of the invention comprises a top panel type or board-like member 1 (FIGS. 2 and 4). The saw horse further comprises a bottom panel type or board-like member 2 (FIGS. 1 to 4). The saw horse of the invention still further comprises a pair of panel type or board-like side members 3 and 4 (FIGS. 1, 2 and 4).

A plurality of fastening devices 5, 6, 7 and 8 (FIG. 2) affix the top, bottom and side members 1, 2, 3 and 4, respectively, to each other at their ends to form a rectangular configuration, as shown in FIGS. 1 and 2. Each of the fastening devices 5 to 8 is the same as the others and comprises an L-shaped angle member or bracket.

In accordance with the invention, a pair of foot members 9 and 10 (FIGS. 1, 2 and 4) are pivotally affixed to the bottom member 2 in juxtaposition with said bottom member and in spaced relation with each other. The foot members are affixed to the bottom member in a manner whereby the foot members are positioned in alignment with the bottom member in inoperable, storage or carrying position, as shown in FIG. 4, and extend substantially at right angles with the bottom member, although in a plane parallel to that of the bottom member, in operable position, as shown in FIGS. 1 and 2, whereby they support the saw horse in an upright position, as shown in FIGS. 1 and 2.

The foot members 9 and 10 have the configuration of the bottom member 2 in their inoperable position. The edges 11 and 12 of the foot members 9 and 10, respectively (FIGS. 1 and 2), abut each other in inoperable position and are at 45° relative to the sides 13 and 14, and 15 and 16 of the foot members, respectively (FIG. 2).

The side members 3 and 4 have slots 17 and 18 formed therethrough (FIGS. 2 and 4) for removably accommodating a tool. Any desired tool may be accommodated in the slots 17 and 18, as long as it has a part which fits into such slots.

In a preferred embodiment of the compact saw horse of the invention, the foot members 9 and 10 are affixed to the bottom member 2 by bolts and wing nuts so that they may be readily tightened, loosened, rotated and positioned, as desired, without difficulty. FIG. 3 shows the bolt 19 and the wing nut 20 which affix the foot member 10 to the bottom member 2.

While the invention has been described by means of a specific example and in a specific embodiment, I do not wish to be limited thereto, for obvious modifications will occur to those skilled in the art without departing from the spirit and scope of the invention.

I claim:

1. A compact saw horse, comprising
a top panel type member;
a bottom panel type member;
a pair of panel type side members;
a plurality of fastening means affixing the top, bottom and side members to each other at their ends to form a rectangular configuration; and
a pair of foot members pivotally affixed to the bottom member in juxtaposition therewith in spaced relation with each other in a manner whereby the foot members are positioned in alignment with the bottom member in inoperable position and extend at substantially right angles with the bottom member, although in a plane parallel to that of the bottom member, in operable position whereby they support the saw horse in an upright position, each of the foot members having spaced opposite first and second ends and being pivotally affixed to the bottom member considerably closer to the first end than to the second whereby in their operable position one of said foot members extends for most of its length from one side of the bottom member and the other of said foot members extends for most of its length from the other side of said bottom member to maintain the side members substantially vertical, said foot members having the configuration of the bottom member in their inoperable position, the edges of said foot members abutting each other in inoperable position and being at 45° relative to the sides thereof.

2. A compact saw horse as claimed in claim 1, wherein each of the side members has a slot formed therethrough for removably accommodating a tool.

* * * * *